United States Patent [19]

Zonni et al.

[11] 4,001,439

[45] Jan. 4, 1977

[54] METHOD OF PRODUCING ICE CREAM IN INDIVIDUAL SLICED FORM

[76] Inventors: Nick Zonni, 6311 Southwind Drive; Marco Zonni, 10420 Lundene Drive, both of Whittier, Calif. 90601

[22] Filed: May 3, 1976

[21] Appl. No.: 682,715

[52] U.S. Cl. .............................. 426/101; 426/565; 426/249
[51] Int. Cl.² .......................................... A23G 9/04
[58] Field of Search .......... 426/101, 249, 565, 515; 62/66, 69

[56] References Cited

UNITED STATES PATENTS

| | | | |
|---|---|---|---|
| 2,085,495 | 6/1937 | Fulkerson | 426/101 |
| 2,847,947 | 8/1958 | Pelletier | 426/249 |

*Primary Examiner*—Jeanette M. Hunter
*Attorney, Agent, or Firm*—Francis X. LoJacono, Sr.

[57] ABSTRACT

Method of producing ice cream and like products which includes providing a pair of matching molds wherein each mold is filled with various layers of soft ice cream in a sequential overlapping manner, one of the molds having a food product such as a plurality of cherries longitudinally disposed in a contiguous arrangement on the layers of ice cream; thereafter, the ice cream in each mold is frozen along with the food product at which time a last layer of ice cream is added to the top of each mold and these molds are then sealed together, allowing the last layers of ice cream to comingle and also be frozen to form a single elongated cylindrical ice cream bar. Once the bar is frozen and separated from the molds thereof, the bar is cut providing a multiplicity of slices having a predetermined thickness, wherein each slice thereof includes equal amounts of the various frozen food products centrally disposed therein.

8 Claims, 10 Drawing Figures

U.S. Patent   Jan. 4, 1977   4,001,439
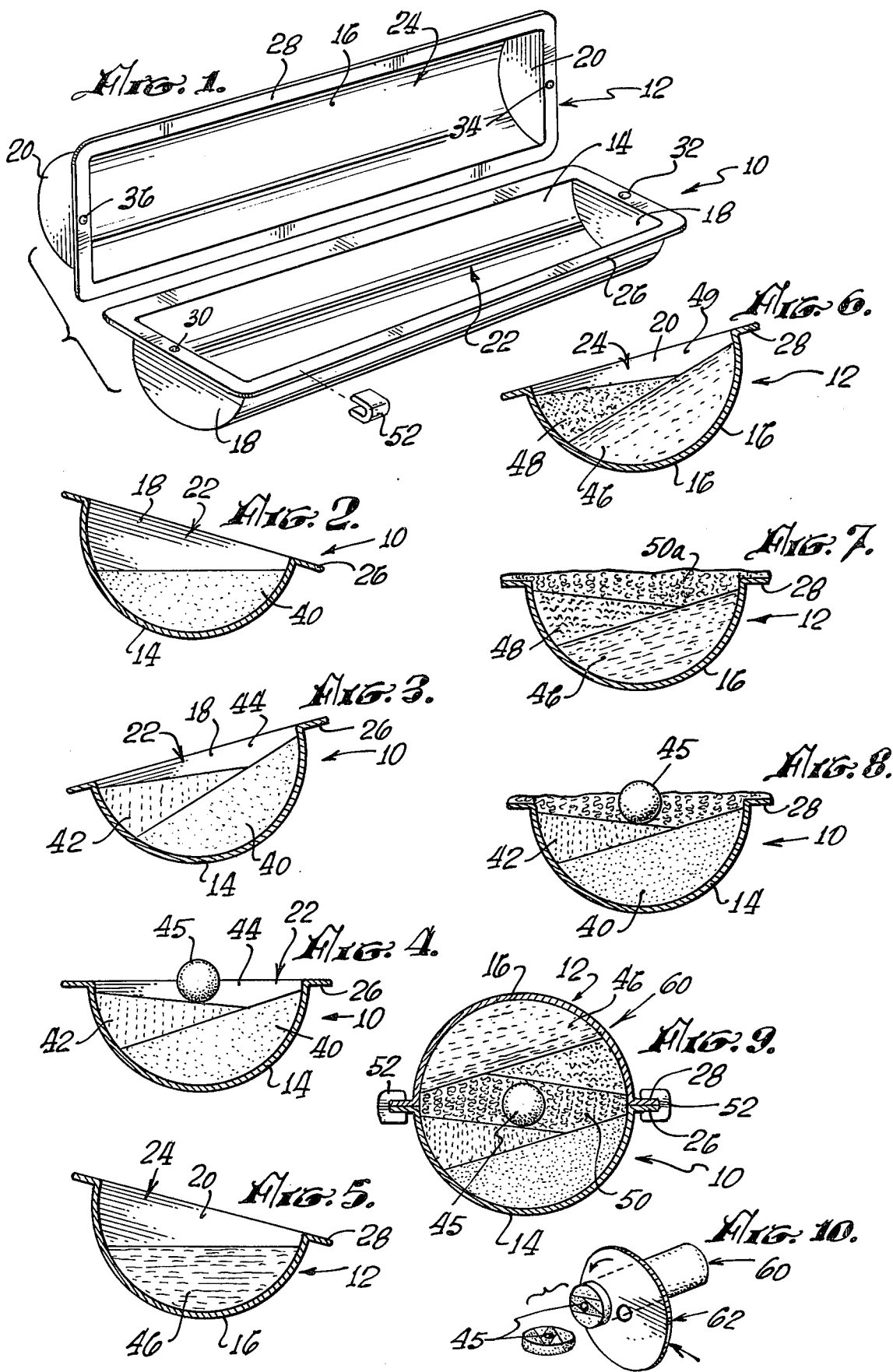

METHOD OF PRODUCING ICE CREAM IN INDIVIDUAL SLICED FORM

BACKGROUND OF THE INVENTION

1. Field of the Invention

This invention relates to producing frozen confections such as ice cream and sherbet, and more particularly to the forming of individual sliced portions thereof having equal amounts of fruits and nuts disposed therein.

2. Description of the Prior Art

As is well known in the art various types and forms of ice cream are now being produced and packaged for over-the-counter sales. This type of packaging is normally present for sale in containers of several sizes— from cup size to large cans of several gallons. The ice cream is generally deposited in the containers in a partially frozen condition, and then immediately covered and sent to a hardening room.

When the ice cream is prepared and stored in this normal manner the even, equal displacement of various garnishes, such as fruits and nuts, is almost impossible to predetermine. Thus, in supplying restaurants and other eating establishments, as well as in catering large numbers of people, it is always desirable to serve individual portions in identical amounts with the identical ingredients. However, this is not now generally possible due to the manner in which frozen desserts are packaged in their containers.

Thus, there has been a need to provide a uniform ice cream or other frozen dessert product whereby all the portions are identical in size, appearance and ingredients.

SUMMARY OF THE INVENTION

This invention relates to a process for forming ice cream and like products wherein individual slices are provided having equal amounts of all ingredients disposed therein and arranged in a particular form having predetermined thickness, wherein each slice within a given package is identical to the others.

Generally, the process comprises a pair of matching molds formed having an elongated compartment, the compartment being of any configuration. However, the preferred forms as herein indicated include an arcuate wall so that the complete molded ice cream is formed as a cylindrical bar.

Each mold is individually filled with overlapping layers of soft ice cream, the layers being of various colors, flavors and ingredients. One such type of ice cream is well known commerically as "Spumoni". Spumoni ice cream almost always includes nuts and cherries therein. In order to provide a uniform consistency in the end product thereof, the process includes the positioning of the fruit, particularly cherries, in a longitudinal contiguous manner throughout the length of one mold. Thus, after the layers are deposited in the molds just below the leading edge of the compartment, the cherries are then arranged as described. Following this, both molds are then placed in a freezer and hardened. After they are hardened, each mold is filled to a point slightly above the compartment at which time the molds are coupled together so as to form a single mold, allowing the last layer of soft ice cream to co-mingle and become one layer. The molds form a single unit and are again frozen wherein the cherries are now positioned substantially in a line along the central axis of the molded cylindrical ice cream bar. Thereafter, the ice cream bar is sliced in any suitable controlled manner, whereby the thickness is predetermined for packaging.

OBJECTS AND ADVANTAGES OF THE INVENTION

The present invention has for an important object a provision for forming individual circular slices of ice cream having equal parts of various colors and flavors of ice cream, wherein a fruit such as a cherry is disposed substantially in the center thereof.

It is another object of the invention to provide a method of producing ice cream in the manner described wherein each slice includes a cherry therein.

It is further object of the invention to provide a method of this character wherein the slices can be packaged as individual servings.

A still further object of the invention is to provide a method of producing ice cream in slices whereby the ice cream is formed by a pair of matching molds creating an elongated ice cream bar having a circular configuration with each layer of ice cream disposed in an overlapping longitudinal arrangement.

It is still another object of the invention to provide a method of this character that is relatively inexpensive to produce.

The characteristics and advantages of the invention are further sufficiently referred to in connection with the accompanying drawings, which represent one embodiment. After considering this example, skilled persons will understand that variations may be made without departing from the principles disclosed and I contemplate the employment of any structures, arrangements or modes of operation that are properly within the scope of the appended claims.

DESCRIPTION OF THE DRAWINGS

Referring more particularly to the accompanying drawings, which are for illustrative purposes only:

FIG. 1 is a perspective view of the pair of matching molds;

FIG. 2 is a cross-sectional view of the first mold having the first layer of soft ice cream disposed therein;

FIG. 3 is a cross-section similar to FIG. 2, illustrating a second layer of ice cream overlapping the first layer thereof;

FIG. 4 is a view showing the fruit (cherry) centrally positioned therein;

FIG. 5 shows a third layer of ice cream disposed in the second mold, similar to FIG. 1;

FIG. 6 is a cross-sectional view illustrating the following step of adding a fourth layer of ice cream over the third layer thereof;

FIG. 7 is a similar cross-section showing the final layer of ice cream disposed in the second mold;

FIG. 8 also illustrates the final layer of ice cream positioned within the first mold and surrounding the fruit previously disposed therein;

FIG. 9 is a cross-sectional view illustrating the two molds in a joining mode and coupled together to form a circular ice cream bar having the fruit centrally disposed therein; and FIG. 10 is a schematic perspective view showing the ice cream bar being sliced for packaging.

DESCRIPTION OF THE PREFERRED EMBODIMENT

Referring more particularly to the drawings, there is shown in FIG. 1 a pair of matching molds, wherein the first or bottom mold is generally indicated at 10 and the top or second mold is indicated at 12. Both molds are formed having an arcuate semi-circular wall 14 and 16, respectively, with end walls 18 and 20, respectively.

Walls 14 and 18 define an elongated compartment 22 of mold 10; and walls 16 and 20 define the elongated compartment 24 of mold 12. Annularly formed about each respective mold 10 and 12 are laterally extending flange members 26 and 28. The portions of the flange members adjacent the end walls are provided with recesses and buttons adapted to be received in said recesses. Thus, flange 26 has recess 30 at one end and button 32 at the opposite end thereof. Flange 28 includes recess 34 to correspond to button 32, and button 36 to correspond to recess 30. A further detailed description will hereinafter show the molds in conjunction with the method of the invention.

STEPS OF THE METHOD

It should be first understood that several types of ice cream or other well known frozen desserts can be substituted for any as herein described and that various numbers of layers can also be used. However, the arrangement as herein described is related to making ice cream known as "Spumoni" ice cream, the Italian-style variety, wherein five different kinds of ice cream are combined to create individual servings. Also included in the above are the use of nuts and fruits; and in this particular variety cherries are employed.

The first step in forming the combination of ice creams to create a circular ice cream bar is to deposit a first layer of ice cream 40 in compartment 22. This layer can be arranged at an angle, as seen in FIG. 2. Thus, an angular space is left to receive a second layer of ice cream 42, as seen in FIG. 3. As an example, layer 40 can be white (vanilla) and layer 42 can be pink (strawberry).

It should be noted that the ice creams are deposited in the molds in a thixotropic state—that is, the ice cream is in a soft or semi-hardened condition.

The first and second layer are so arranged longitudinally in compartment 40 that a space 44 is left between the exposed layers 42 and 40. The next step is to place the fruit in bottom mold 14, the fruit in this case represented by cherry 45. Said fruit is positioned from one end wall 18 to other end wall 18 centrally located in a contiguous end-to-end manner. The bottom mold is then placed in a freezer compartment to be hardened.

The second or top mold 12 is also provided with third and fourth layers of ice cream 46 and 48, respectively, identical to that in said first mold 10. Space 49 is left between the upper edge of the compartment 24 and layers 46 and 48, layer 46 being represented by chocolate and layer 48 by yellow (rum). This mold is then frozen along with the first mold.

After the ice cream in both molds are frozen solid, spaces 44 and 49 are then filled to slightly above the flanges 26 and 28. FIG. 7 illustrates a layer 50a as disposed over layers 46 and 48, while FIG. 8 shows layer 50b being formed over layers 42 and 40, and surrounding most of the cherries 45. Accordingly, both molds are at this time coupled together by matching the buttons 34 and 36 to respective recesses 32 and 30 and held together by a clamping means, shown as clips 52. As the molds are secured to each other, layers 50a and 50b co-mingle to become one layer 50, as seen in FIG. 9, which could be indicated as having a green (pistachio) color.

However, it should be understood that simpler steps can be taken wherein the compartments 22 and 24 are filled to a point below the edge thereof with a single type of ice cream, rather than a plurality thereof as described.

Thus, the steps are reduced wherein compartment 22 of mold 10 is frozen after being properly filled in one step leaving space 44; and compartment 24 of mold 12 is also filled by the same ice cream with space 49 being left. The fruit is then added as previously described and both are then frozen. A third layer is then added, comprising the last central layers as represented by 50a and 50b. Therefore, a variety of layers can be arranged.

After the ice cream bar, designated at 60, is frozen and removed from the molds, it is then placed in any suitable cutting or slicing means 62, and the bar 60 is cut as seen in FIG. 10 thereby providing individual slices for individual servings. Thereafter, the slices are packaged for storage and shipping by wrapping each slice in individual protective sheets and placing a plurality of wrapped slices in containers. It is important to note that each slice is uniform in thickness and each slice includes an equal portion of the fruit 45—this is due particularly to the way the fruit is arranged in the mold.

The invention and its attendant advantages will be understood from the foregoing description and it will be apparent that various changes may be made in the form, construction and arrangement of the parts of the invention without departing from the spirit and scope thereof or sacrificing its material advantages, the arrangement herein before described being merely by way of example, and I do not wish to be restricted to the specific form shown or uses mentioned, except as defined in the accompanying claims.

We claim:
1. A method of producing ice cream in individual sliced form, comprising the steps of:
   providing a pair of matching molds, said molds having an elongated compartment formed therein to receive the ice cream, one of said molds being the top mold and the other said mold being the bottom mold;
   depositing at least one layer of soft ice cream in said compartment of each mold to a point below the open edge of each mold, wherein a space is arranged between the layer of ice cream and the open edge thereof;
   positioning a plurality of a fruit product in one of said molds, said fruit being arranged longitudinally therein in a contiguous manner;
   freezing said ice cream disposed in said molds;
   adding another soft layer of ice cream within said space in said molds after freezing;
   joining said molds together allowing the soft layers of ice cream to co-mingle;
   freezing said ice cream to form a single elongated ice cream bar; and
   slicing said ice cream bar into a multiplicity of slices having a predetermined thickness.
2. A method as recited in claim 1, wherein the molds are defined by end walls and an elongated arcuate wall, whereby the ice cream bar is formed in a cylindrical configuration.

3. A method as recited in claim 2, wherein the following steps are included therein:
- depositing a first layer of soft ice cream in said compartment of said top mold;
- depositing a second layer of soft ice cream in said compartment of said top mold substantially superposed over said first layer thereof;
- freezing said first and second layers of ice cream therein;
- depositing a third layer of soft ice cream in said compartment of said bottom mold;
- depositing a fourth layer of soft ice cream in said compartment of said bottom mold substantially superposed over said third layer;
- positioning the plurality of fruit in said bottom mold over said third and fourth layer of ice cream therein;
- freezing said third and fourth layer together with said fruit therein;
- adding a fifth layer of soft ice cream in each of said molds after freezing said ice cream therein, wherein the fifth layer in both molds extends over the open edges thereof prior to joining said molds; and
- slicing said ice cream bar after removal from said molds so as to include a piece of fruit in each of said slices in equal amounts therein.

4. A method as recited in claim 3, wherein said first layer of soft ice cream is deposited in an angular displacement along the longitudinal compartment, said second layer being angularly deposited in an overlapping manner to said first layer thereof; and wherein said third layer is deposited in an angular displacement along its respective compartment, and said fourth layer is angularly deposited in an overlapping manner to said first layer thereof.

5. A method as recited in claim 4, wherein each layer of ice cream comprises a different flavor and color.

6. A method as recited in claim 5, wherein said fruit comprises a plurality of cherries positioned substantially along the central axis of the ice cream bar, whereby a cherry is provided within the central portion of each slice of ice cream.

7. A method as recited in claim 1, wherein the following step is included:
- providing a releasable clamping means to hold each mold in a joining relationship during freezing of the ice cream therein.

8. A method as recited in claim 1, wherein the following steps are included after slicing said ice cream bar:
- wrapping each slice with a protective sheet; and
- storing a plurality of wrapped slices in a sealed container.

* * * * *